(12) United States Patent
Yahagi et al.

(10) Patent No.: US 8,896,277 B2
(45) Date of Patent: Nov. 25, 2014

(54) VOLTAGE REGULATOR

(71) Applicant: Seiko Instruments Inc., Chiba (JP)

(72) Inventors: Akihito Yahagi, Chiba (JP); Takashi Imura, Chiba (JP)

(73) Assignee: Seiko Instruments Inc., Chiba (JP)

( * ) Notice: Subject to any disclaimer, the term of this patent is extended or adjusted under 35 U.S.C. 154(b) by 35 days.

(21) Appl. No.: 13/718,451

(22) Filed: Dec. 18, 2012

(65) Prior Publication Data

US 2013/0162231 A1    Jun. 27, 2013

(30) Foreign Application Priority Data

Dec. 21, 2011   (JP) ................................. 2011-280113

(51) Int. Cl.
| | | |
|---|---|---|
| *G05F 1/00* | (2006.01) | |
| *G05F 1/625* | (2006.01) | |
| *H02M 1/00* | (2006.01) | |
| *H02M 3/156* | (2006.01) | |

(52) U.S. Cl.
CPC ....... *G05F 1/625* (2013.01); *H02M 2001/0032* (2013.01); *H02M 3/156* (2013.01)
USPC ............................ 323/238; 323/271; 323/234

(58) Field of Classification Search
CPC .......... H02M 1/36; H02M 2001/0032; H02M 3/156–3/158
USPC ......... 323/271, 315, 238, 282–285, 288, 242, 323/321, 901
See application file for complete search history.

(56) References Cited

U.S. PATENT DOCUMENTS

| | | | | |
|---|---|---|---|---|
| 5,966,005 | A * | 10/1999 | Fujimori ........................ | 323/315 |
| 6,348,833 | B1 * | 2/2002 | Tsujimoto et al. ............ | 327/540 |
| 6,791,397 | B2 * | 9/2004 | Shimozono .................... | 327/543 |
| 7,573,252 | B1 * | 8/2009 | Griesert ........................ | 323/315 |

(Continued)

FOREIGN PATENT DOCUMENTS

JP        2008-109747 A      5/2008

OTHER PUBLICATIONS

Al-Shyoukh, M.; Hoi Lee A Compact Ramp-Based Soft-Start Circuit for Voltage Regulators Jun. 2, 2009 Circuits and Systems II: Express Briefs, IEEE Transactions on (vol. 56 , Issue: 7 ) pp. 535-539.*

(Continued)

*Primary Examiner* — Timothy J Dole
*Assistant Examiner* — Shahzeb K Ahmad
(74) *Attorney, Agent, or Firm* — Brinks Gilson & Lione

(57) ABSTRACT

Provided is a voltage regulator including a soft-start circuit having a small area and capable of suppressing an inrush current by causing a reference voltage circuit to rise gently with time. In the soft-start circuit, a capacitor is connected to an output of a reference voltage circuit driven by a constant current of a constant current circuit, and hence the soft-start circuit can raise a reference voltage gently to prevent an inrush current with a small area. After the end of a soft-start period, the constant current circuit is disconnected, and the reference voltage circuit is driven by a power source. Thus, the operation becomes stable.

2 Claims, 3 Drawing Sheets

(56) References Cited

U.S. PATENT DOCUMENTS

| | | | |
|---|---|---|---|
| 2007/0063736 A1* | 3/2007 | Biagi | 326/82 |
| 2009/0243579 A1* | 10/2009 | Lim et al. | 323/284 |
| 2009/0289608 A9* | 11/2009 | Al-Shyoukh | 323/238 |
| 2010/0052636 A1* | 3/2010 | Takagi et al. | 323/281 |
| 2010/0060248 A1* | 3/2010 | Kao et al. | 323/280 |
| 2011/0279045 A1* | 11/2011 | Uchimoto et al. | 315/186 |
| 2012/0153924 A1* | 6/2012 | Lipka et al. | 323/299 |
| 2012/0249104 A1* | 10/2012 | Heng | 323/282 |

OTHER PUBLICATIONS

Al-Shyoukh, M.; Hoi Lee A Compact Fully-Integrated Extremum-Selector-Based Soft-Start Circuit for Voltage Regulators in Bulk CMOS Technologies Oct. 14, 2010 Circuits and Systems II: Express Briefs, IEEE Transactions on (vol. 57 , Issue: 10 ); pp. 818-822.*

* cited by examiner

VOLTAGE REGULATOR

RELATED APPLICATIONS

This application claims priority under 35 U.S.C. §119 to Japanese Patent Application No. 2011-280113 filed on Dec. 21, 2011, the entire content of which is hereby incorporated by reference.

BACKGROUND OF THE INVENTION

1. Field of the Invention

The present invention relates to a voltage regulator, and more specifically, to a voltage regulator having a soft-start function of suppressing an inrush current that occurs at a time of steep rise of power supply.

2. Description of the Related Art

FIG. 2 illustrates a block diagram of a voltage regulator. The voltage regulator includes an output transistor 1, a voltage dividing circuit 2, a reference voltage circuit 3, an error amplifier 4, and a soft-start circuit 5. At the time of steep rise of power supply, the soft-start circuit 5 controls a reference voltage Vref output from the reference voltage circuit 3 so that a reference voltage Vss may rise gently, to thereby suppress an inrush current.

The conventional soft-start circuit of the voltage regulator is formed of a circuit as illustrated in FIG. 3 (see, for example, Japanese Patent Application Laid-open No. 2008-109747).

The soft-start circuit 5 increases the reference voltage Vss gradually to a target value. The soft-start circuit 5 includes a digital circuit 71 for inputting a clock, a step circuit 72 for increasing the reference voltage Vref from 0 V to the target value in a stepwise manner, and a buffer circuit 73 for converting a change in step output of the step circuit 72 into a reference voltage Vss having a gentle gradient.

The conventional soft-start circuit, however, has the following problem.

When the reference voltage Vss is increased in a stepwise manner, as the reference voltage Vss becomes higher, the amount of the voltage increase per step becomes larger, resulting in an increased inrush current. On the other hand, in order to reduce the amount of the voltage increase per step, the number of stages of resistors needs to be larger, resulting in an increased area of the soft-start circuit.

SUMMARY OF THE INVENTION

The present invention has been devised for solving the above-mentioned problem, and provides a voltage regulator including a soft-start circuit having a small area and capable of suppressing an inrush current by causing a reference voltage circuit to rise gently with time.

According to an exemplary embodiment of the present invention, there is provided a voltage regulator including a soft-start circuit, the soft-start circuit including: a constant current circuit; a reference voltage circuit driven by a current of the constant current circuit; a capacitor provided at an output terminal of the reference voltage circuit; a soft-start signal output circuit for detecting a reference voltage to output a soft-start signal; a first switch circuit provided between the constant current circuit and the reference voltage circuit, the first switch circuit being turned ON in response to the soft-start signal during a soft-start period; and a second switch circuit provided between a power source and the reference voltage circuit in parallel with the first switch circuit, the second switch circuit being turned OFF in response to the soft-start signal during the soft-start period.

According to the present invention, the capacitor is connected to the output of the reference voltage circuit driven by the constant current of the constant current circuit, and hence the soft-start circuit having a small area and capable of raising the reference voltage gently so as to prevent an inrush current can be constituted. After the end of the soft-start period, the constant current circuit is disconnected, and the reference voltage circuit is driven by the power source. Thus, the operation becomes stable.

Further, a cascode circuit is provided to the reference voltage circuit, and hence, after the end of the soft-start period, the characteristics against ripples and noise can be improved.

DETAILED DESCRIPTION OF THE PREFERRED EMBODIMENT

Referring to the accompanying drawings, a soft-start circuit of a voltage regulator according to an embodiment of the present invention is described below.

Figure 1:
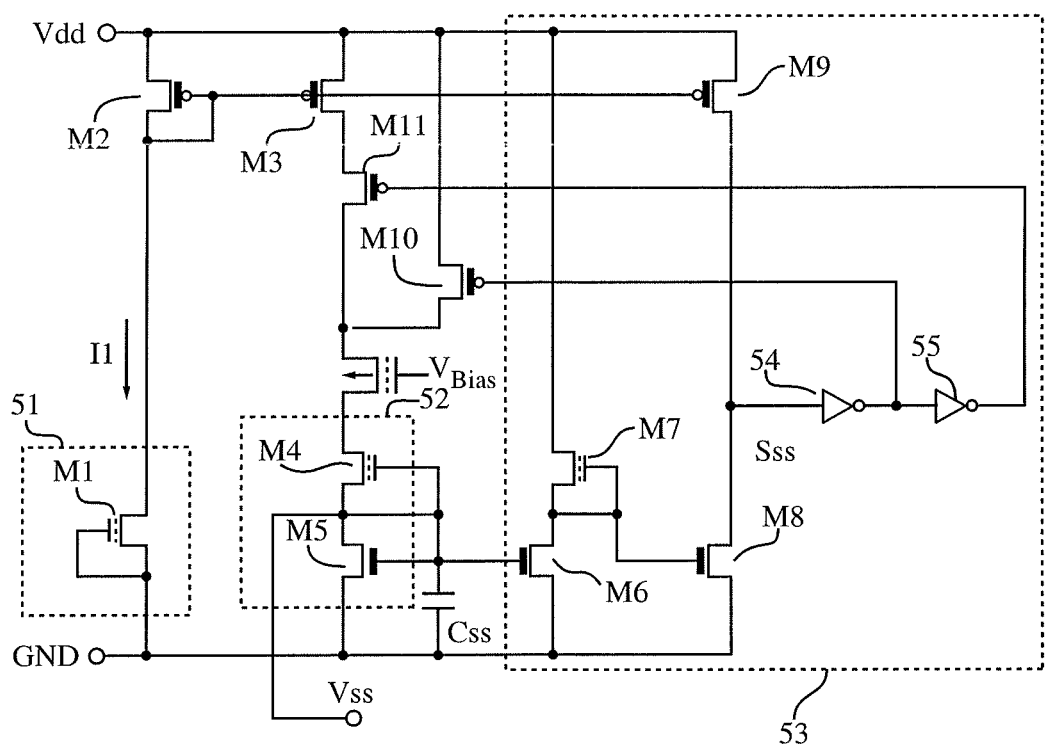
FIG. 1 is a circuit diagram illustrating a soft-start circuit of a voltage regulator according to an embodiment of the present invention.
Figure 2:
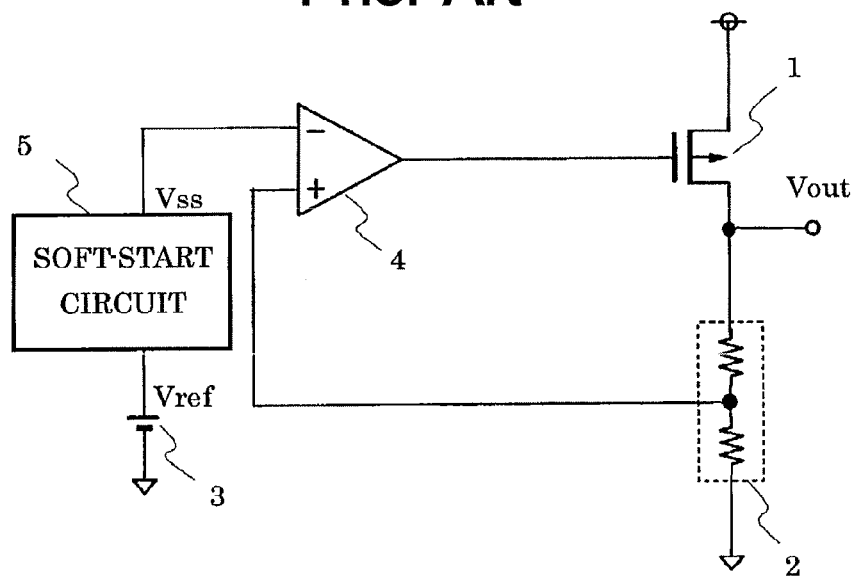
FIG. 2 is a block diagram illustrating a voltage regulator.
Figure 3:
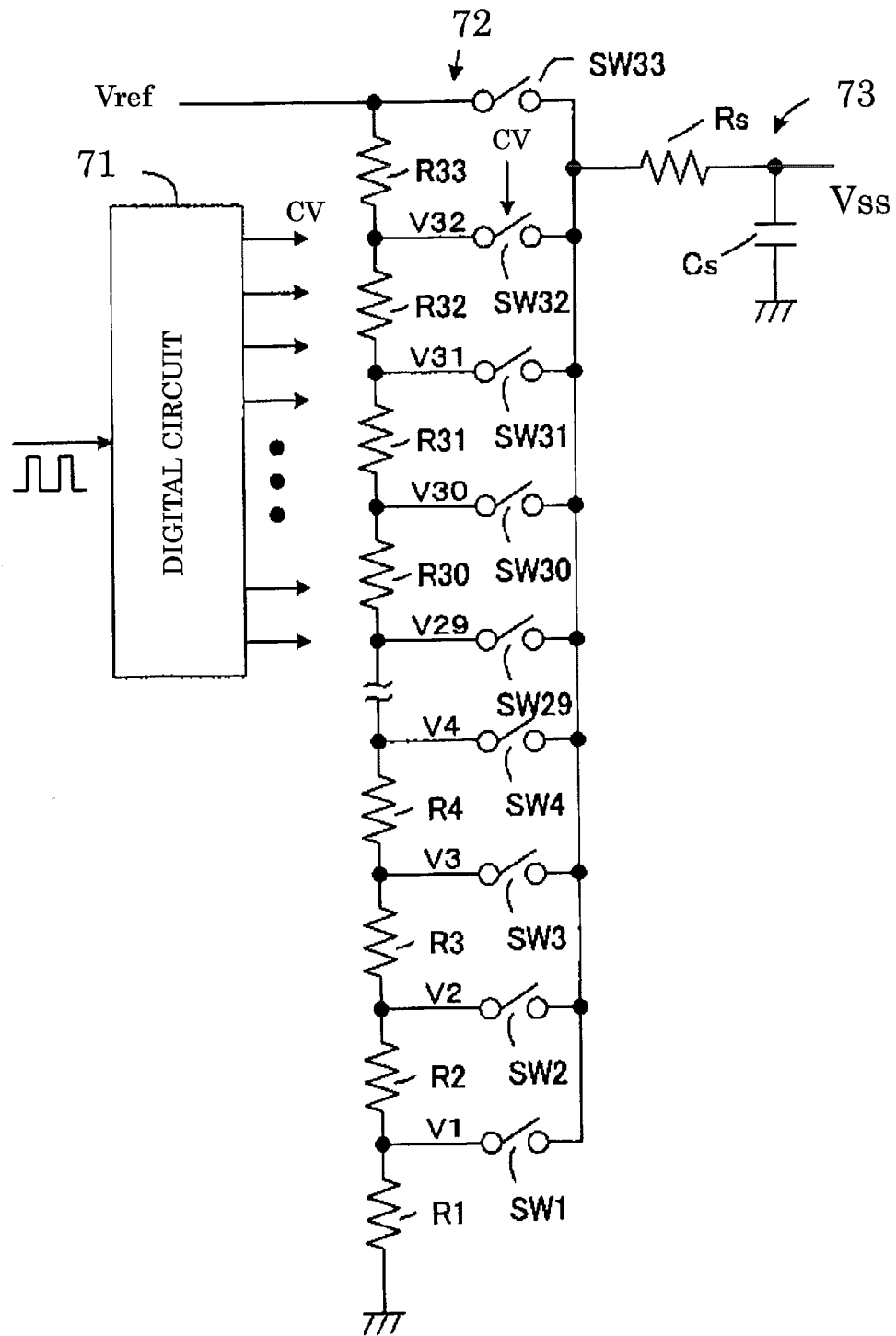
FIG. 3 is a circuit diagram illustrating a conventional soft-start circuit.

FIG. 1 illustrates the soft-start circuit in this embodiment, corresponding to a reference voltage circuit 3 and a soft-start circuit 5 of a voltage regulator of FIG. 2.

The soft-start circuit in this embodiment includes a constant current circuit 51, a reference voltage circuit 52, a capacitor Css, an Sss output circuit 53 for outputting a soft-start signal Sss, and a reference voltage output terminal Vss for outputting a reference voltage Vss.

The constant current circuit 51 is formed of a depletion mode MOS transistor M1, for example. The reference voltage circuit 52 is an ED type reference voltage circuit formed of a depletion mode MOS transistor M4 and a MOS transistor M5. The Sss output circuit 53 is formed of a comparator and an inverter, or for example two series connected inverters 54 and 55. The comparator is an ED type comparator formed of a depletion mode MOS transistor M7 and a MOS transistor M6, for example.

The constant current circuit 51 is connected to a saturation-connected PMOS transistor M2. The PMOS transistor M2 has a gate connected to gates of PMOS transistors M3 and M9, and mirrors and reflects a constant current I1 to those transistors. The reference voltage circuit 52 receives the constant current reflected by the PMOS transistor M3 to generate a reference voltage Vref. The capacitor Css is connected to an output terminal of the reference voltage circuit 52. The capacitor Css is charged by a current based on the reference voltage Vref to generate the reference voltage Vss, and outputs the reference voltage Vss to the reference voltage output terminal Vss. A PMOS transistor M10 serving as a switch circuit is inserted between the PMOS transistor M3 and the reference voltage circuit 52. A PMOS transistor M11 serving as a switch circuit is connected in parallel to the PMOS transistor M3 and the PMOS transistor M10.

In the comparator, a gate of the NMOS transistor M6 corresponding to an input terminal is connected to an output of the reference voltage circuit 52, and an output terminal is connected to a gate of an NMOS transistor M8. The NMOS transistor M8 has a drain connected to a drain of the PMOS transistor M9, and outputs the soft-start signal Sss.

Although not illustrated, the reference voltage output terminal Vss is connected to an input terminal of an error amplifier 4 of the voltage regulator.

Next, the operation of the soft-start circuit in this embodiment is described.

When the voltage regulator is activated, the constant current I1 flows to the constant current circuit 51, which is mirrored from the PMOS transistor M2 to the PMOS transistor M3 and the PMOS transistor M9 so that a constant current flows therethrough. The capacitor Css has not been charged, and hence a voltage at the output terminal of the reference voltage circuit 52 is low, and the reference voltage Vss is also low. The NMOS transistor M6 is turned OFF, and hence the comparator outputs High. The soft-start signal Sss is Low level because the NMOS transistor M8 is turned ON.

In this case, the PMOS transistor M10 is turned OFF because a voltage of High level obtained by inverting the soft-start signal Sss is input to the gate thereof. The PMOS transistor M11 is turned ON because the soft-start signal Sss is input to the gate thereof. Therefore, during a soft-start period, the reference voltage circuit 52 operates by the constant current I1. Then, the capacitor Css is charged by the reference voltage of the reference voltage circuit 52.

On this occasion, the constant current I1 is sufficiently small while the capacitor Css is sufficiently large, and hence the reference voltage Vss increases gradually, thus realizing a soft-start function.

In this case, when the soft-start time is represented by Tss, the capacitance of the capacitor Css is represented by Css, and the charge quantity is represented by Q, the charge quantity Q is expressed by Expression (1).

$$Q = I1 \times Tss = Css \cdot Vss \quad (1)$$

Expression (1) is solved for Vss to obtain Expression (2).

$$Vss = (I1/Css) \times Tss \quad (2)$$

It is understood from Expression (2) that the reference voltage Vss rises linearly with time. Therefore, during the soft-start period, the reference voltage Vss increases gradually and linearly.

Next, when the reference voltage Vss increases gradually, that is, when the NMOS transistor M6 is turned ON, the comparator outputs Low level. The NMOS transistor M8 is turned OFF, and hence the soft-start signal Sss is inverted to High level and indicates that the soft-start period has ended.

After the end of the soft-start period, the PMOS transistor M10 is turned ON because a voltage of Low level obtained by inverting the soft-start signal Sss is input to the gate thereof, and the PMOS transistor M11 is turned OFF because the soft-start signal Sss is input to the gate thereof. Therefore, the reference voltage circuit 52 operates stably by a current from a power supply voltage Vdd.

As described above, according to the soft-start circuit in this embodiment, it is possible to provide a voltage regulator having a soft-start circuit having a small area and capable of suppressing an inrush current by raising the reference voltage circuit gently with time.

Note that, the soft-start circuit in this embodiment has the configuration in which the current of the constant current circuit 51 is mirrored and then supplied by the PMOS transistor M3 and the PMOS transistor M9, but a constant current may be supplied to the reference voltage circuit 52 directly from a constant current circuit. Alternatively, a constant current circuit may be provided instead of the PMOS transistor M9. The present invention is not limited to the circuit in this embodiment.

Further, in the soft-start circuit in this embodiment, a cascode circuit formed of depletion mode transistors may be inserted between the PMOS transistor M3 and the reference voltage circuit 52. After the end of the soft-start period, the reference voltage circuit 52 becomes more stable by the operation of the cascode circuit, and hence the characteristics against ripples and noise are improved.

What is claimed is:

1. A voltage regulator comprising a soft-start circuit, the soft-start circuit comprising:
a constant current circuit;
a reference voltage circuit driven by a current of the constant current circuit;
a capacitor at an output of the reference voltage circuit;
a soft-start signal output circuit for detecting a reference voltage of the reference voltage circuit to output a soft-start signal through first and second series connected inverters;
a first switch circuit connecting the constant current circuit to the reference voltage circuit, the first switch circuit being turned ON in response to the soft-start signal from an output of the second inverter during a soft-start period; and
a second switch circuit connecting a power source to the reference voltage circuit in parallel with the first switch circuit, the second switch circuit being turned OFF in response to the soft-start signal from an output of the first inverter during the soft-start period.

2. A voltage regulator according to claim 1, wherein the soft-start circuit further comprises a cascode circuit comprised of a depletion mode transistor between a contact point of the first switch circuit and the reference voltage circuit.

* * * * *